United States Patent
Kahle

[15] 3,693,061

[45] Sept. 19, 1972

[54] MOTOR CONTROLLED MAGNETIC TAPE PLAYBACK MACHINES

[72] Inventor: Wilhelm Manfred Kahle, Lucerne, Quebec, Canada

[73] Assignee: Her Majesty the Queen in right of Canada as represented by the Secretary of State

[22] Filed: Dec. 16, 1970

[21] Appl. No.: 98,836

[30] Foreign Application Priority Data

Dec. 17, 1969 Canada......................070,136

[52] U.S. Cl.....................................318/7, 242/75.44

[51] Int. Cl................................................H02p 7/00

[58] Field of Search.....................318/6, 7; 242/75.44

[56] References Cited

UNITED STATES PATENTS 3,444,445 5/1969 Mullin...........................318/7

3,218,529 11/1965 Evans et al. ...................318/7

3,269,670 8/1966 Brian, Jr. et al. ..........318/7 X

*Primary Examiner*—T. E. Lynch

*Attorney*—Stevens, Davis, Miller & Mosher

[57] ABSTRACT

The application discloses an improved three-motor tape playback machine intended primarily for the teaching of languages. The machine is provided with relays which act to render the amplifier circuits of the machine inoperative when the operating push buttons are operated, so reducing at least to a very low level switching and other noises from the sound output. The arrangement also reduces mechanical noise from the machine.

11 Claims, 3 Drawing Figures

PATENTED SEP 19 1972

3,693,061

SHEET 1 OF 3

MOTOR CONTROLLED MAGNETIC TAPE PLAYBACK MACHINES

This invention relates to magnetic tape playback machines, and although not limited in its application to playback machines used in the teaching of languages it is in this context that the invention was developed and in this context the invention has proved most advantageous.

For use in the teaching of languages, a tape playback machine must be easy to operate. It must produce a good clear sound if the reproduced speech is to contain all the elements to be taught to the student. And in order that the student shall be able to listen to the reproduced sounds without distraction, the tape playback machine must provide the played-back speech free from switching noises and other distracting "noise."

Existing machines do not meet these requirements, and furthermore in most machines the operation of the various controls to produce "PLAYBACK," "STOP," "FAST FORWARD," and "REVERSE" require the operation of manual controls actually on the tape playback machine.

An object of the present invention is the provision of an improved magnetic tape playback machine such that it can readily be used for the teaching of languages.

According to the present invention, a magnetic tape playback machine includes a first motor arranged to drive a tape storage reel in the REWIND direction, a second motor arranged to drive a capstan in the FORWARD direction, and a third motor arranged to drive a tape take-up reel at a suitable speed in the forward direction, electromagnetic relays arranged to control the operation of these motors, switch means arranged to control the operation of the electromagnetic relays, and muting means arranged to mute sound reproducing parts of the playback machine during operation of the switch means, whereby switching noises are reduced at least to a low level in the sound output from the machine.

Figure 1A:
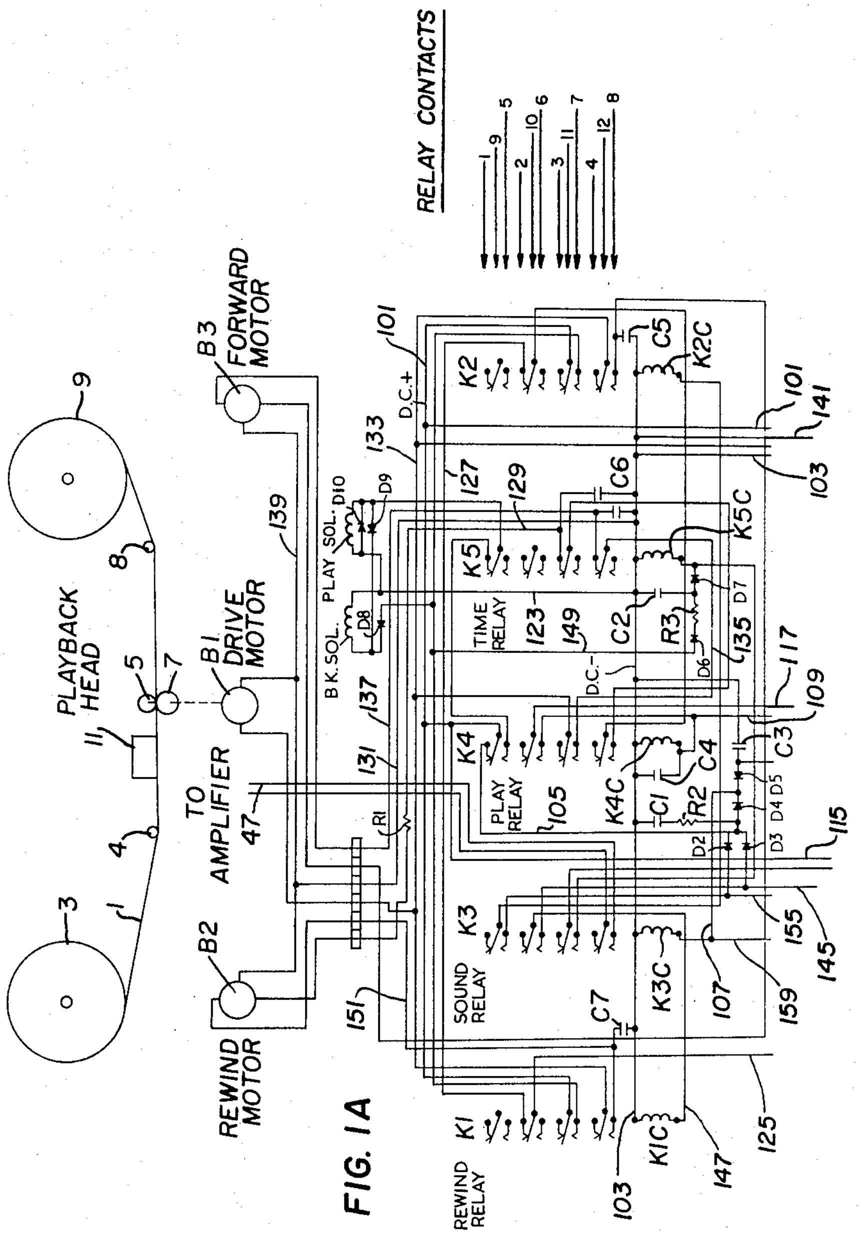
Figures 1B, 1C:
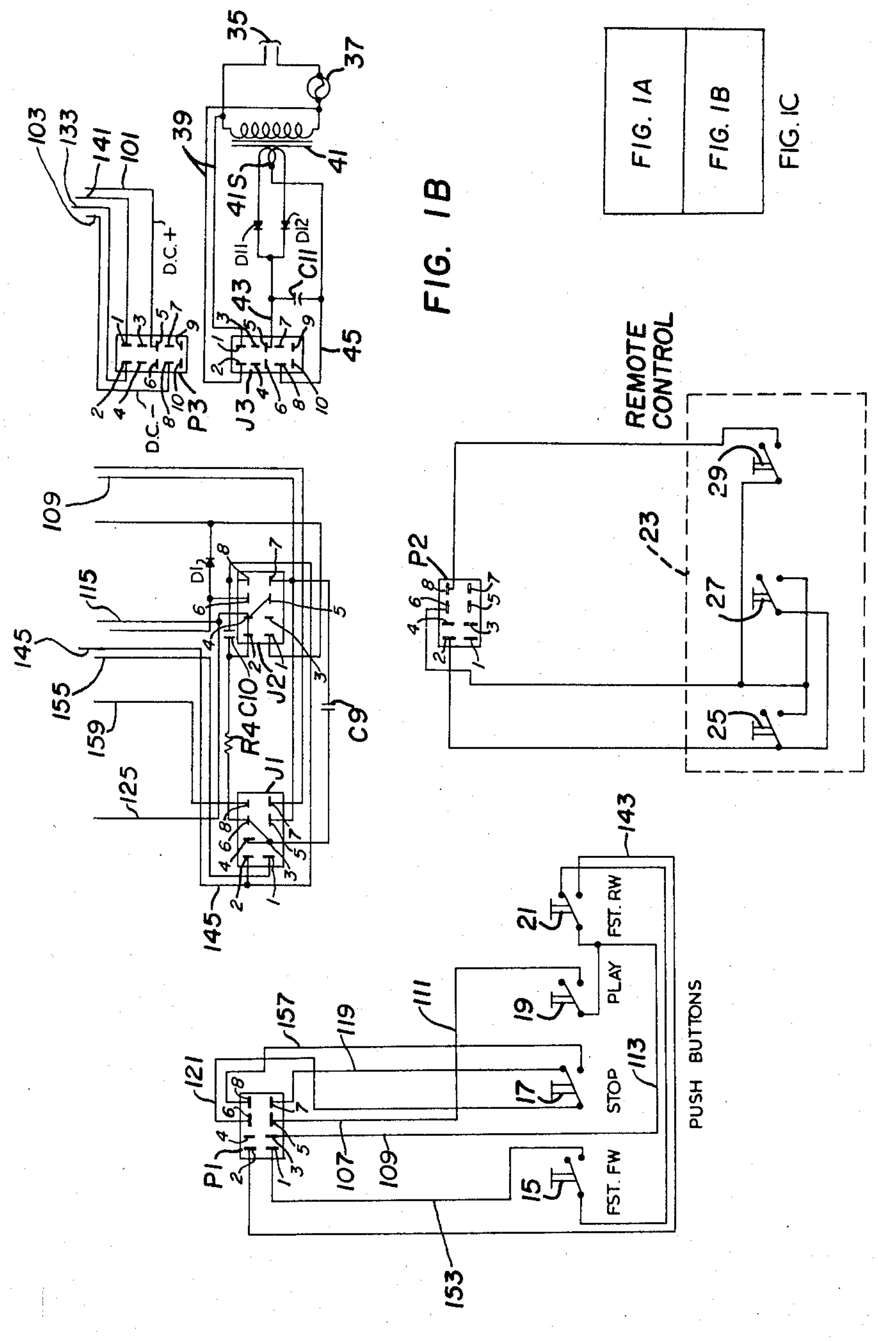
Figure 2:
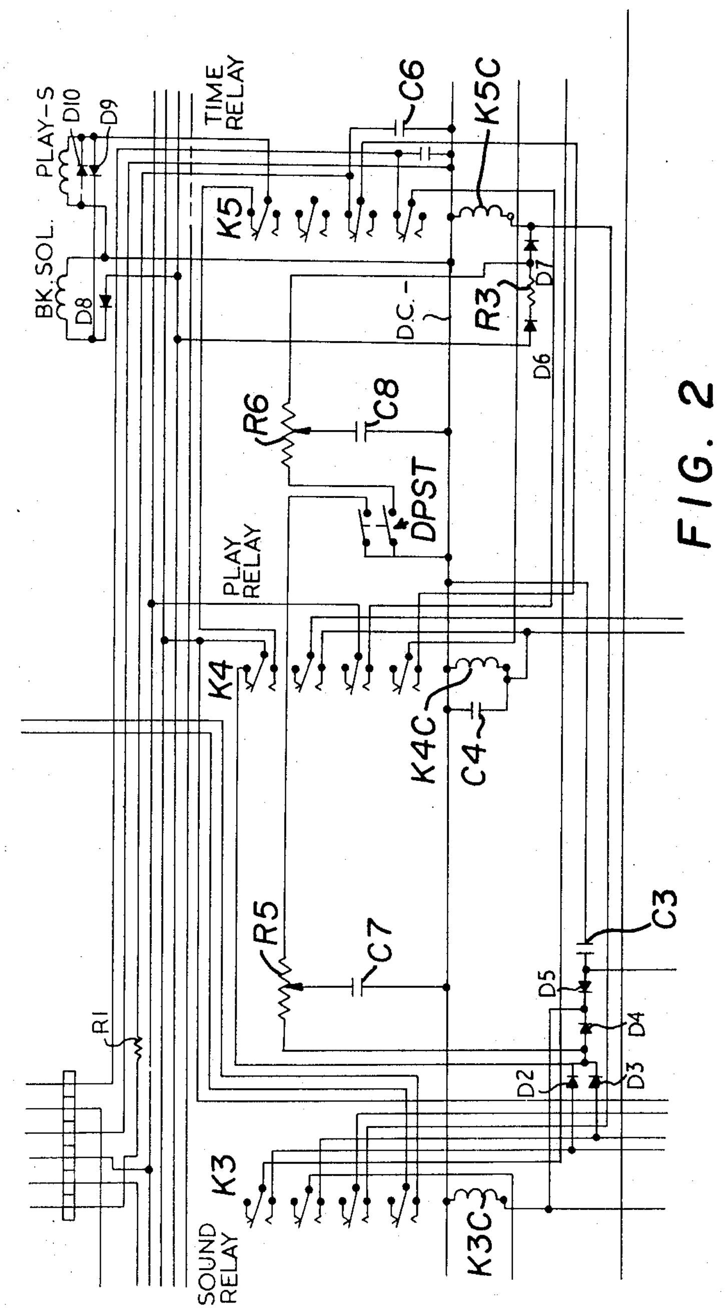

The invention will now be described, by way of example, with reference to the accompanying drawings, in which:

FIGS. 1A and 1B, when arranged as indicated in FIG. 1C, together form the circuit diagram of the motor control circuits of a magnetic tape playback machine; and FIG. 2 shows a modification of the central part of the circuit shown in FIG. 1A.

The embodiment of the invention described herein shows the invention applied to a standard tape deck made and sold, and commercially available, under the Trade Mark "VIKING." The invention can, of course, be applied to other standard tape decks made by other manufacturers, but then suitable modifications, which will be obvious to those skilled in the art, may be necessary in view of minor differences in the arrangement of the circuits of different tape decks.

The tape playback machine illustrated is a typical three motor machine. The details of the amplifiers and the loud speakers are not shown and follow orthodox design. The magnetic tape 1 is threaded from a storage spool 3 over a guide roller 4 past a capstan 5 against which it is pressed in operation by an idler pressure roller 7 whenever a PLAY solenoid PLAY 5 is energized and from which it passes over a guide roller 8 to a take-up spool 9. A magnetic playback head 11 is positioned between the storage spool 3 and the capstan 5, close to the capstan. A first motor B1 drives the capstan 5 at a steady speed in a "forward" direction only; a second motor B2 drives the storage spool 3 in a "rewind" direction, i.e., in a direction which will transport the tape 1 back from the take-up spool 9 to the storage spool 3; and a third motor B3 attempts to drive the take-up spool 9 in a "forward" direction at a speed such that the take-up spool would, if it could, take up magnetic tape at a speed faster than it is fed past the capstan 5 by the motor B1, so ensuring that no slack builds up in the part of the tape between the capstan and the takeup spool. Mechanical brakes are provided for the spools to stop overwind; these are biassed to the "ON" position but are released when a brake solenoid BK SOL is energized.

The operation of the three motors is controlled through five relays, namely REWIND relay K1, FORWARD relay K2, SOUND relay K3, PLAY relay K4 and TIME relay K5, each of which relays is an electromagnetically operated multicontact relay having an operating coil denoted by the suffix "C" and six movable contacts, each coacting in one state of the relay with a first fixed contact and in the second state of the relay with a second fixed contact.

These relays function in accordance with the setting of either four fixed push buttons on the tape playback machine indicated as FAST FORWARD push button 15, OFF push button 17, PLAY push button 19 and FAST REWIND push button 21; or of three push buttons on a remote control unit 23 and indicated as MOMENT PLAY push button 25, PLAY push button 27 and REWIND push button 29. The buttons 15 to 21 are connected to the rest of the circuit through a plug P1 and a complementary jack J1, while the unit 23 is connected to the circuit through a plug P2 and jack J2.

Power for operation of the tape machine is derived from a 110 volts AC supply 35, which through a fuse 37 energizes two leads 39 of a 110 volts AC supply and through an isolating step-down transformer 41 energizes a center-tapped secondary winding 41S providing through two diodes D11 and D12 a 24 volts DC supply smoothed by a capacitor C11 to leads 43 and 45. This power supply is connected through a plug P3 and jack J3 to the remainder of the circuit.

The components of the circuit are listed below, and their method of interconnection is shown clearly in FIGS. 1A and 1B.

| RESISTORS | | | DIODES |
|---|---|---|---|
| R1 | 100 ohms | 10 watts | D1 to D12; all type IN2071 |
| R2 | 330 ohms | | Relays |
| R3 | 47 ohms | 1 watt | K1 to K5; all Potters & Brumfield type |
| R4 | 47 ohms | 1 watt | KHP 17D11 24 volts DC |
| CAPACITORS | | | |
| C1 | 500 microfarads | | |
| C2 | 500 microfarads | | |
| C3 | 100 microfarads | | |
| C4 | 100 microfarads | | |
| C5 | 0.47 microfarads | | |
| C6 | 0.47 microfarads | | |
| C8 | 0.47 microfarads | | |
| C9 | 0.1 microfarads | | |
| C10 | 0.47 microfarads | | |
| C11 | 1,000 microfarads | | |

FIG. 1A also shows leads 47 which are connected to the amplifier which handles the signal from the playback head 11 and passes the amplified signal to a loudspeaker and a headphone jack of the playback machine.

Unlike most tape playback machines, the present machine is intended to start playing once the PLAY button is depressed, and keep playing until the STOP button is pressed, and to revert to PLAY automatically after any operation of the fast rewind and fast forward buttons are terminated. This mode of operation is most beneficial in the context of language instruction, since it enables the instructor very rapidly to move from one part of the prepared tape to another part, typically to return to the beginning of a sentence after it has been played through. It would of course be possible to use the ordinary keys or buttons on a standard tape recorder in a somewhat similar manner, but whereas such buttons are normally used only occasionally between PLAY periods which exceed say 3 minutes and would often be 10 or so minutes, in the case of language tuition a sentence lasting say 30 seconds may be replayed many times one after another, and use of ordinary tape player keys becomes clumsy and slow, and breaks the teaching rhythm.

A further major feature of the machine described above is that the sound amplifier is muted during switching, so that the output is free from switching noise. Again, in an ordinary tape playing machine, switching takes place so infrequently that the level of switching noise which can be tolerated is relatively high, and all that is necessary is to avoid excessively loud switching clicks and the like. On the other hand, when during language tuition the machine is constantly being switched between PLAY and fast forward and fast rewind, any switching noise at all becomes most distracting. The use of relays to effect automatic reversion to the PLAY mode accentuates that problem.

Considering now the operation of the apparatus shown in the drawings, the arrangement of transformer 41 and diodes D11 and D12 provides d.c. operating power, this appearing as a positive voltage on pins 5 of jack J3 and plug P3, and as a negative voltage on pins 8 of jack 3 and plug P3. At the same time, mains operating voltage of 110 volts 60 Hertz appears between pins 1 and 2 of jack J3 and plug P3.

The d.c. voltage is used to energize as required the operating coils K1C, K2C, K3C, K4C and K6C of the relays K1, K2, K3, K4 and K5 and the operating coils BK. SOL. of the brake and PLAY SOL. of the pressure roller 5. It will be seen that at all times d.c. positive is applied to lead 101 and d.c. negative is applied to lead 103. Further, each of the relay operating coils has one end connected permanently to lead 103, i.e., to d.c. negative.

Initially, when the tape playback machine is idle, the SOUND relay K3 has its operating coil K3C energized from d.c. positive lead 101 through closed contacts 1 and 9 of relay K4 and lead 105, forwardly through diode D4 and then through lead 107. It follows that contacts 8 and 12 of SOUND relay K3 are in engagement and thus leads 47 are joined together to provide muting of the amplifier. During this initial period, the series combination of capacitor C1 and Resistor R2 is connected across the coil K3C and the capacitor C1 becomes charged. Capacitor C1 has a value of 500 microfarads, and thus stores an appreciable charge.

When the PLAY push button 19 is depressed, it causes energization of the play relay coil K4C and consequent changeover of the movable relay contacts 9, 10, 11 and 12 from the positions shown in FIG. 1A (contacting contacts 1, 2, 3 and 4 respectively) to their alternative positions (contacting contacts 5, 6, 7 and 8 respectively). In more detail, depression of PLAY button 19 completes a circuit which extends from the lower end of PLAY relay operating coil K4C down through lead 109 to pins 5 of jack J1 and plug P1, then through lead 111 to the contact of PLAY button 19, to the movable contact of that switch, through lead 113 to pins 3, 4 and 6 of jack J1 and plug P1, and from pin 6 of jack J1 through resistor R4 and lead 115 to d.c. positive lead 101.

With the energization of relay K4, the contacts 1 and 9 separate, and this removes the circuit which was holding the SOUND relay K3 energized. However, for a short time the charge stored on capacitor C1 is sufficient to maintain a holding current through coil K3C, so that release of relay K3 is delayed, and the value of resistor R2 is sufficient both to limit the current flow and to ensure that this delay is long enough for the switching cycle to be completed while the amplifier is still muted.

With the energization of relay K4, its contacts 6 and 10 make to provide a "hold" circuit for the relay coil K4C even although the PLAY pushbutton is now released. This circuit is required to replace the connection between pins 5 and 3 of Jack J1 and plug P1 previously supplied by PLAY switch 19, and extends from pin 5 of jack J1 through lead 109, relay contacts 6 and 10, lead 117 to pins 7 of jack J1 and plug P1, lead 119 to STOP switch 17, and lead 121 back to pins 3, 5 and 6 of jack J1 and plug P1.

Termination of PLAY can be effected by operation of STOP button 17, which breaks the hold circuit just described.

With the closure of contacts 9 and 5 of PLAY relay K4, a d.c. voltage is applied to the play solenoid PLAY SOL., so that the pressure roller 5 is moved forward to press the tape 1 against the capstan 7, and to the brake solenoid BK.SOL. to cause release of the mechanical band brakes on the drives to tape spools 3 and 9. Thus d.c. from lead 101 is applied through closed contacts 9 and 5 of relay K4 through closed contacts 9 and 1 of TIME relay K5 to the play solenoid PLAY SOL. and through diode D9 to the brake solenoid, and a path to d.c. negative is provided by lead 123 to lead 103. In order to apply a braking force to the storage spool 3, the associated a.c. rewind motor B2 is energized with direct current in order to provide vibration-free braking during use. The d.c. energization is supplied from positive lead 101 through lead 115 and then lead 125, closed contacts 10 and 2 of REWIND relay K1 and lead 127 and closed contacts 2 and 10 of relay K2 and then closed contacts 12 and 8 of PLAY relay K4 and then closed contacts 11 and 3 of TIME relay K5 through lead 129 and resistor R1 to the motor B2, from which a negative return extends through lead 131 to negative lead 103. With d.c. energization, the motor does not run, but it resists rotation.

The forward motor B3 is also energized to provide tape take-up. This motor is an a.c. motor, and the energizing circuit extends from one a.c. lead 133 through closed contacts 11 and 7 of relay K4, lead 135 and closed contacts 12 and 4 of relay K5 and lead 137 to motor B3. The return path is through leads 139 and 131 to negative d.c. lead 103, which also serves as the second a.c. lead and is connected by lead 141 to pins 1 of jack J3 and plug P3.

The main drive motor B1 is an a.c. motor driven at a steady speed and energized from the a.c. leads 133 and 103. Thus from lead 133 a circuit can be seen to one side of the motor B1, and from the other side of the motor through leads 139 and then 131 to lead 103. It will be seen that this motor runs continuously while power is supplied to the machine from supply 35.

Operation during PLAY is orthodox, and typically is interrupted by depression of the FAST REWIND switch 21. This causes first energization of relay coil K3C and then energization of relay coil K1C. In more detail, the lead 113 (already connected to d.c. positive lead 101 as described above) is connected through switch 21 to lead 143 and thus to pins 2 of jack 1 and plug 1, and to lead 145. The voltage on lead 145 is applied through diode D3 to charge the capacitor C1 through resistor R2, and also through diode D4 to energize the SOUND relay coil K3C. Once the sound relay has operated, the voltage on lead 145 is applied through closed contacts 6 and 10 of that relay, and lead 147, to energize REWIND relay coil K1C.

With the energization of SOUND relay K3, the leads 47 are connected together to mute the amplifier. When REWIND relay K1 is energized, the positive d.c. on lead 103 is applied through closed contacts 11 and 7 of that relay and lead 149 to diode D6 and thence through resistor R6 to charge the capacitor C2. This d.c. voltage also is applied through diode D7 to energize the TIME DELAY relay operating coil K5C, so that this relay K5 also changes state.

The voltage on lead 149 is applied through diode D8 to energize the brake solenoid BK. SOL., but the opening of contacts 1 and 9 of relay K5 removes the energization of play solenoid PLAY SOL., so that the pressure roller 5 moves away from capstan 7 and tape transport ceases, the brake bringing the two reels and the tape rapidly to rest.

The opening of the contacts 3 and 11 on relay K5 removes the d.c. braking voltage from the motor B2, and the opening of the contacts 4 and 12 removes the a.c. energizing voltage from the forward motor B3.

Since relay K1 is now energized, rewind motor B2 is supplied with a.c. to drive it in the "rewind" direction. Thus lead 133 is connected through closed contacts 12 and 8 of relay K1 and lead 151 to the motor B2, the other side of which is still connected to the other a.c. lead 103 through lead 131. Contacts 2 and 10 on this relay open to ensure the removal of braking d.c. from motor B2 before the application of rewind a.c. energization.

There is no "hold" circuit on the rewind button 21, and the relay K1 remains energized only as long as the button 21 remains depressed. On release of the button 21, the circuit through lead 145 and 143 is broken, and rewind relay K becomes de-energized. The opening of its contacts 11 and 7 removes the d.c. voltage from lead 149, so that the brake solenoid BK. SOL. is de-energized and the brake is applied to stop the rewind movement of the tape and reels.

The relay K3 does not immediately change state, since current is supplied by the capacitor C1, and similarly relay K5 is held on by current supplied by capacitor C2. This delay provides for the time required to brake the tape and reels to rest. The arrangement is such that relay K5 always releases before relay K3, since relay K3 provides the muting of the amplifier, and this is required to continue until all other switching is finished. In this way the emission of "pops" from the associated loudspeaker is avoided. When relay K3 is released, the play solenoid PLAY SOL. is energized the brake solenoid is energized, the d.c. braking current is applied to the rewind motor B2, and a.c. power is applied to the forward motor B3, so that the machine is back in the PLAY mode.

When, during a PLAY operation, the FAST FORWARD button 15 is depressed, lead 113 is connected through lead 153 and pins 1 of jack 1 and plug 1 to lead 155. This charges capacitor C1 and energizes coil K3C of the sound relay K3 to mute the amplifier, and once that has taken place, through closed contacts 9 and 1 of relay K3 energizes the coil K2C of fast forward relay K2. The forward motor B3 is then energized for fast forward, the brake solenoid is energized to release the brake, and the play solenoid is de-energized to free the tape from the capstan. Again, when the fast forward button 15 is released, the machine reverts to its PLAY mode.

Operation of the stop button 17 breaks the circuit through lead 119 and establishes a connection between leads 121 and 157. The sound relay K3 is energized by the signal applied from lead 157 through lead 159 (pins 8 of jack J1 and plug P1) thus muting the amplifier. The breaking of the circuit through leads 107 and 119 removes the d.c. voltage applied to coil K4C and capacitor C4, with the result that this relay changes state after a time delay sufficient to ensure that muting has taken place. Relay K3 remains energized by a voltage applied to its operating coil K3C through contacts 1 and 9 of relay K4 once relay K4 has released, and this hold remains effective while the machine is in the STOP mode.

It will be seen from the above that the machine automatically reverts to the PLAY mode after being operated in either the fast forward or rewind modes, but will remain in the stop mode upon actuation of the stop button.

The remote control unit shown can be used when desired, and it provides a simplified control consisting only of STOP PLAY and REWIND. The two STOP/PLAY switches 25 and 27 are in parallel, and one is a momentary contact switch (i.e., it remains shut only when held shut) and the other is a two position switch, while button 29 provides the REWIND facility. In more detail, when plug P2 is inserted into jack J2, REWIND switch 29 can connect together pins 6 and 8 of jack J2 and plug P2 to provide REWIND operation, and STOP/PLAY switches 25 and 27 can connect together pins 2 and 6 to provide STOP operation, as an alternative to the otherwise existing PLAY operation. It will be seen that in jack J2 there is a jumper between pins 2 and 4 and another between pins 4 and 5. As a result, by the jumper across pins 5 and 7 the PLAY relay coil K4C is energized when the plug is inserted into the socket. When switch 25 or switch 27 is closed, pins 2 and 6 in jack J2 and plug P2 are connected together, and also to pins 4 and 5, which energizes first the sound relay K3 to effecting muting and then relay K5 to bring the machine into the STOP mode. Opening of both switches 25 and 27 de-energizes relay coils K5C and K3C, but as explained earlier the release of sound relay K3 is delayed by the charge on capacitor C1 to ensure muting until after relay K5 has completed its switching operation. The operation of relay K5 restores the PLAY mode.

The REWIND switch 29 on closure connects lead 145 through pins 8 of jack J2 and plug P2 and the switch contacts to pins 6 of jack J2 and plug P2 and thus through diode D1 and diode D5 to energize the sound relay coil K3C to produce muting, and then through contacts 7 and 11 of relay K3 to energize time relay coil K5C and the rewind relay coil K1C, so causing REWIND. Release of switch 29 restores the PLAY mode.

Referring now to FIG. 2, this illustrates a modification to the central part only of the circuit shown in FIG. 1A. It will be seen that resistor R2 and capacitors C1 and C2 of FIG. 1A and the following items are added:

| | |
|---|---|
| R5 | 1,000 ohm potentiometer |
| R6 | 1,000 ohm potentiometer |
| C7 | 500 microfarads capacitor |
| C8 | 500 microfarads capacitor |
| DPST | double pole single throw switch |

It will be seen that the movable contacts of the switch DPST are grounded, so that when this switch is closed ground is applied to both potentiometers R5 and R6. Whereas the two capacitors C1 and C2 in FIG. 1A are connected directly to ground, in the modification of FIG. 2 they are connected to the sliders of the potentiometers R5 and R6 respectively to provide an adjustment in their operating conditions.

A tape playback machine will often be used to play both 5 inch reels and 7 inch reels, and the reel braking circuits in the circuit of FIG. 1A are quite effective for 7 inch reels but tend to produce too long a braking period for 5 inch reels. By the modification shown in FIG. 2, the braking period can be reduced to that really necessary for 5 inch reels, when 5 inch reels are to be used for language tuition, and this in practice has been found to permit approximately halving of the braking period.

By the use of the switch DPST, it is possible to change the role of the potentiometers R5 and R6 to that of series resistors. Thus it is possible, after appropriate setting of the potentiometers R5 and R6, to change without adjustment between 5 inch reel braking and 7 inch reel braking merely by operation of this switch DPST.

I claim:

1. A magnetic tape playback machine including:

a. a first motor arranged to drive a tape storage reel in a REWIND direction;

b. a second motor arranged to drive a capstan in the FORWARD direction;

c. a third motor arranged to drive a tape take-up reel at a suitable speed in the forward direction;

d. electromagnetic relays arranged to control the operation of these motors;

e. switch means arranged to control the operation of the electromagnetic relays;

f. one of said relays being arranged to act as muting means to mute sound reproducing parts of the playback machine; and g. interconnections between the relays such that the said one of the relays is operated to cause muting before the other relays are operated, and such that that relay remains operated to maintain muting until such other relays have completed operation;

whereby switching noises arising from operation of said relays are substantially eliminated from said sound reproducing parts of the machine.

2. A magnetic tape playback machine as claimed in claim 1, wherein the second motor is a synchronous a.c. motor to provide stable speed of the tape during playback.

3. A magnetic tape playback machine as claimed in claim 2, wherein rectifier means are provided arranged to provide a direct current supply derived from an alternating current supply to the second motor, and the first motor is an a.c. motor, but is energized by this direct current source during playback of the magnetic tape to serve as a brake.

4. A magnetic tape playback machine as claimed in claim 3, wherein the first motor is energized by alternating current during rewinding of the magnetic tape.

5. A magnetic tape playback machine as claimed in claim 3, wherein the third motor is a non-synchronous AC motor driven from the said alternating current supply.

6. A magnetic tape playback machine as claimed in claim 1, wherein a time delay circuit causes the muting means to be operative for a predetermined time sufficient to avoid the reproduction of switching noises in the said sound output.

7. A magnetic tape playback machine as claimed in claim 6, wherein the said time delay circuit includes a capacitor arranged to delay variations in a control voltage applied to one or more of the said electromagnetic relays.

8. A magnetic tape playback machine as claimed in claim 1 wherein brake means for the tape reels are operated by an electromagnetic device, and the duration of the operating cycle of this device is readily adjustable.

9. A magnetic tape playback machine as claimed in claim 8, wherein means for adjusting the said duration of the operating cycle include a capacitor and variable resistor means which control an operating cycle of the capacitor and thus the duration of the operating cycle of the electromagnetic device and of the brake means.

10. A magnetic tape playback machine as claimed in claim 1, and in which:

a. the switch means include a PLAY switch and a REWIND switch;

b. said interconnections between said relays are such that after operation and release of the REWIND switch the machine automatically reverts to a PLAY mode.

11. A magnetic tape playback machine including:

a. a first motor arranged to drive a tape storage reel in a REWIND direction;

b. a second motor arranged to drive a capstan in the FORWARD direction;

c. a third motor arranged to drive a tape take-up reel at a suitable speed in the forward direction;

d. electromagnetic relays arranged to control the operation of these motors;

e. switch means arranged to control the operation of the electromagnetic relays;

f. the switch means including a PLAY switch and a REWIND switch; and g. interconnections between the relay, such that after operation and release of the REWIND switch the machine automatically reverts to the PLAY mode.

* * * * *